United States Patent
Dingwall et al.

(10) Patent No.: US 10,447,797 B2
(45) Date of Patent: Oct. 15, 2019

(54) METHOD AND SYSTEM FOR A UNIFORM RESOURCE IDENTIFIER (URI) BROKER

(71) Applicant: Avaya Inc., Santa Clara, CA (US)

(72) Inventors: Bryan Dingwall, Mississauga (CA); Sergey Vlasenko, St. Petersburg (RU); Mohammad Nezarati, Richmond Hill (CA)

(73) Assignee: Avaya Inc., Santa Clara, CA (US)

( * ) Notice: Subject to any disclaimer, the term of this patent is extended or adjusted under 35 U.S.C. 154(b) by 958 days.

(21) Appl. No.: 14/802,274

(22) Filed: Jul. 17, 2015

(65) Prior Publication Data

US 2016/0021207 A1 Jan. 21, 2016

Related U.S. Application Data

(60) Provisional application No. 62/026,313, filed on Jul. 18, 2014.

(51) Int. Cl.

| H04L 29/08 | (2006.01) |
| G06F 16/955 | (2019.01) |
| H04L 12/24 | (2006.01) |
| G06F 9/445 | (2018.01) |
| H04L 29/12 | (2006.01) |

(52) U.S. Cl.
CPC ...... H04L 67/2814 (2013.01); G06F 16/9558 (2019.01); H04L 67/02 (2013.01); H04L 67/2809 (2013.01); G06F 9/44526 (2013.01); G06F 16/955 (2019.01); H04L 41/0293 (2013.01); H04L 61/308 (2013.01); H04L 67/306 (2013.01)

(58) Field of Classification Search
CPC ..... H04L 67/02; H04L 67/28; H04L 67/2814; H04L 67/2809; H04L 67/2819; H04L 67/36; H04L 67/306; H04L 67/308; H04L 63/107; H04L 63/308; H04L 41/0293; H04L 61/308; G06F 17/30876; G06F 8/60; G06F 9/44526; G06F 16/9558; G06F 16/955
USPC .................................. 709/203; 715/205, 229
See application file for complete search history.

(56) References Cited

U.S. PATENT DOCUMENTS

| 2010/0229045 A1* | 9/2010 | Schultz ............... G06F 8/60 714/37 |
| 2013/0226991 A1* | 8/2013 | Isaacs ............... H04L 67/02 709/203 |
| 2014/0019836 A1* | 1/2014 | Sampathkumaran .............. G06F 17/30876 715/205 |
| 2014/0173700 A1* | 6/2014 | Awan ............... H04L 63/107 726/4 |
| 2015/0161277 A1* | 6/2015 | Heller ............. G06F 9/44526 715/229 |

(Continued)

*Primary Examiner* — Jungwon Chang
(74) *Attorney, Agent, or Firm* — Sheridan Ross P.C.

(57) ABSTRACT

A system provides the ability for developers to create and embed a URI in HTML, a document, or an application to invoke another application or functionality according to a URI scheme name. The invoked application does not natively react to URI selections. Rather, a URI Broker can redirect the URI selection to the desired application and conduct any pre-processing to allow the URI to invoke any application, even those that do not include URI capability.

11 Claims, 11 Drawing Sheets

(56) References Cited

U.S. PATENT DOCUMENTS

| | | | |
|---|---|---|---|
| 2015/0207660 A1* | 7/2015 | Sundaram | H04L 67/2814 709/203 |
| 2016/0004527 A1* | 1/2016 | Udd | G06F 9/44526 717/172 |

* cited by examiner

METHOD AND SYSTEM FOR A UNIFORM RESOURCE IDENTIFIER (URI) BROKER

CROSS REFERENCE TO RELATED APPLICATION

The present application claims the benefits of and priority, under 35 U.S.C. § 119(e), to U.S. Provisional Application Ser. Nos. 62/026,313, filed Jul. 18, 2014, entitled "SYSTEM AND METHOD OF URI BROKER," which is incorporated herein by this reference in its entirety for all that it teaches and for all purposes.

BACKGROUND

In the world of browsing, website designers leverage URIs (Uniform Resource Identifiers and URLs (Uniform Resource Locators) to indicate to the browser to load information or execute information-based actions or decisions based on a user taking action through "hyperlinks" or other "linked" object types within the content. For example, a webpage may include a URI attached to an item of text within a webpage. The text may be highlighted or changed to indicate that a user can select the text to load or execute the URI. In the example, a name of a company may be underlined and highlighted in a different text color, and, when a user selects the text, their computer or mobile device makes a phone call to the company based on a phone number embedded in the URI that is attached to the text.

In computing, a URI is a string of characters used to identify a name of a resource. Such identification enables interaction with representations of the resource over a network, typically the Internet, using specific protocols. Schemes specifying a concrete syntax and associated protocols define each URI. The most common form of URI is the URL, frequently referred to informally as a web address. More rarely seen in usage is the Uniform Resource Name (URN), which was designed to complement URLs by providing a mechanism for the identification of resources in particular namespaces.

A URI scheme is the top level of the URI naming structure, e.g., HTTP, FTP, tel: etc. URIs and absolute URI references are formed with a scheme name, followed by a colon character (":"), and the remainder of the URI is the scheme-specific part.

The most common URI/URL formats are prefixed with identifiers, such as HTTP/FTP, to indicate the type of content to the browser. In addition, non-content (action-based) identifiers such as "mailto:" or "tel:" indicate the ability to send e-mail or call a phone number, respectively, (e.g. mailto:developer@esna.com, tel:9057079700). When using the action-based identifier, the browser or host operating system can determine how the action is interpreted by the browser application itself, or by invoking another application running within the computing system environment. The recipients of the invocation are termed "handlers" (as in, having the ability to handle provided information content in a relevant and functional manner). Examples of handlers can include e-mail applications, such as Microsoft Outlook or Mozilla Thunderbird, which have the ability to handle "mailto:" links, or can include desktop applications, such as Skype or X-lite, which are able to handle tel: links to initiate phone based dialing and audio calling capabilities.

Unfortunately, many applications do not natively enable the capability to handle such URI/URL links or content in a relevant manner. For example, many chat or audio/video calling services, that may be used in a similar manner do not enable the simplicity of the URI actions via the previously described invocation process.

Thus, there are limitations in the current technology as many applications are unable to handle URI invocation actions. Accordingly, there is a need for providing a method and a system that overcomes these limitations.

SUMMARY

Our invention overcomes the above limitations, deficiencies, and other problems associated with the current technology. In embodiments, a system and method provide a mechanism that allows developers to create and embed a URI in HTML, a document, or an application (referred to as an "app") to invoke another application or functionality according to a URI scheme name.

In embodiments, the developer adds the URI scheme name and the preferred app or apps that may be invoked when the URI is selected or used. In one embodiment of the invention the URI scheme and preferred app information is stored in a database that resides on a server that is accessible to other connected devices via the internet or other network e.g. a local area network. In another embodiment of the invention the URI scheme and preferred app information is stored in a list or a database that resides on the connected device itself such that it is accessible to the OS and other app installed on the device.

Developer embeds URI in a webpage, or an app or a document. In the preferred embodiment of the invention the embedded URI invokes another application that may preferably provide presence, location, telephony, messaging, contact or other executable actions.

In one embodiment of the invention the developer may preferably embed the URI in a webpage for example a tel: URI in a contact page of the company such that when a user clicks on the tel: URI it initiates a call to the developer's office phone number using the app (for example Google Hangouts) on the user's device where the URI is being clicked.

In another embodiment of the invention the URI may be embedded in an app e.g. a tel: URI in a video game, such that when a user clicks the tel: URI it initiates a call to the developer's office phone number using the app (or preferred app) on the user's device where the URI is being clicked and the video game is being played.

In yet another embodiment of the invention the URI may be embedded in a document e.g. an MS Word document; e.g. when a user click the tel: URI in the said document it initiates a call to the developer's office phone number using the app (or preferred app) on the user's device where the URI is being clicked.

In yet another embodiment of the invention the URI may also be advantageously embedded in an e-mail and other electronic text communications e.g. a signature.

In one embodiment of the invention the user clicks on a URI, for example the URI is embedded in a webpage that is being displayed in a browser application running on a computing device like a Smartphone; the user may use a touch gesture to click on the URL.

In another embodiment of the invention the URI may be embedded in a MS Word document that is being edited in MS Word application running on a desktop computer; the user may employ a left-mouse click to interact with the URI. In one embodiment of the invention intercept the URI and preferably use browser extension technology to intercept the URI. Browser extensions enable the unique capability of being able to analyze and intercept web page content for the benefit of application feature functionality.

In one embodiment of the invention redirect the URI according to the mapping in the URI Broker e.g. connect to the server that stores the URI Broker to acquire the mapping according to which the URI is redirected. Thus the URI is redirected to an app that is defined in the URI Broker mapping to execute the action. In one embodiment of the invention launch the app as defined in the URI scheme name.

In one embodiment of the invention there may be more than one apps that may be defined in the URI Broker mapping that can complete the action being called by the URI, the user may select one such app that has been specified in the URI Broker to be a preferred app to be invoked for completing the action being called by the URI.

In one embodiment of the invention the user preferences regarding which app to use when a URI is clicked is stored in a database that resides on a server that is accessible to the user's connected devices via the internet or other network e.g. a local area network.

In another embodiment of the invention the user preferences regarding which app to use when a URI is clicked is stored in a list or a database that resides on the connected device itself such that it is accessible to the OS and other app installed on the device.

The invention provides a system and method that allows a developer or a third-party vendors to create, save and then include such URIs in a webpage, app or document such that the said URI invokes a preferred application to execute the functionality that the developer intended e.g. when a user clicks on a URI a video call is initiated using a particular app like Google Hangouts.

The URI Broker enables developers to create and store a non-standard URI that can then be used in a webpage, an app or a documents so that other applications can be invoked when a user click on said URI.

In one embodiment of the invention the system and method of the invention may advantageously use a URI to initiate a chat or audio/video calling service using an app as per the URI Broker mapping. The preferred embodiment of the invention leverages existing web and browser technology protocols e.g. WebRTC, HTML5 to make a broadly compatible solution that is easily usable by developers.

Devices where invention can be advantageously used include but are not limited to a personal computer, a Smartphone, a tablet, a SmartTV, server, any kind of computer or connected device. Thus any developer by embedding the URI in their HTML page can allow the users of that webpage to take advantage of URI to invoke another application to complete an action.

In one embodiment of the invention the URI invoke other apps such that when a user clicks the said URI the app defined in the URI Broker mapping is invoked to complete this action. Such actions may include but are not limited to e.g. initiate a voice call, a video call, SMS, IM session or other form of communications session using the particular app that has been defined in the URI Broker to complete this action.

Without limiting the solution to enterprise users; the solution aims to provide a system and method of URI Broker whereby a developer can create, store and use a non-standard URI to execute a third party app that is installed on the same system.

Aspects of the embodiments include a non-transitory computer readable medium comprising instructions stored in a non-transitory memory and executed by a processor, wherein the instructions cause the processor to execute a method for enabling a uniform resource identifier (URI), the instructions comprising: instructions to receive a selection of the URI, by a user on a user device, wherein the URI is embedded in content received at the user device; instructions to intercept the selection of the URI; instructions to redirect the URI to a URI Broker; and instructions to launch a functionality, by the URI Broker, based on the URI, wherein the functionality does not natively execute based on a URI.

Aspects of the above computer readable medium include wherein the content is one of a webpage, a document, and an application.

Aspects of the above computer readable medium include wherein the functionality is one of a web service, an application programming interface (API), and an application.

Aspects of the above computer readable medium include wherein intercepting the selection of the URI comprises executing browser extension technology that intercepts webpage content.

Aspects of the above computer readable medium further comprise: instructions to retrieve a user preference from a data store; and instructions to launch the functionality based on the user preference.

Aspects of the above computer readable medium include wherein the data store is associated with a server that is in communication with the user device through a network.

Aspects of the above computer readable medium include wherein the URI is associated with a URI scheme and a first preference defined by a developer.

Aspects of the above computer readable medium include wherein the URI scheme and the first preference are stored in the data store.

Aspects of the above computer readable medium further comprise: instructions to retrieve the first preference from the data store; and instructions to launch the functionality based on at least one of the user preference and the first preference.

Aspects of the above computer readable medium include wherein the user preference overrides the first preference.

Aspects of the embodiments include a device comprising: a memory configured to store instructions to execute a URI Broker; a processor in communication with the memory, wherein the processor retrieves the instructions from the memory and executes the URI Broker based on the instructions, wherein, when executing the URI Broker, the processor is configured to: receive content including a URI embedded in the content; receive a selection of the URI; intercept the selection of the URI; redirect the URI; and launch a functionality, based on the URI, wherein the functionality does not natively execute based on a URI.

Aspects of the above device include wherein the content is one of a webpage, a document, and an application, and wherein the functionality is one of a web service, an application programming interface (API), and an application.

Aspects of the above device include wherein the processor is further configured to: retrieve a user preference from a data store, wherein the data store is associated with a server that is in communication with the user device through a network; and launch the functionality based on the user preference.

Aspects of the above device include wherein the processor is further configured to: retrieve a first preference from the data store, wherein the URI is associated with a URI scheme and the first preference defined by a developer, wherein the first preference defines which functionality the developer desires for the URI; and launch the functionality based on at least one of the user preference and the first preference.

Aspects of the above device include wherein the user preference overrides the first preference.

Aspects of the embodiments include a method for enabling a URI, the method comprising: providing a URI Broker executed by a processor of a developer computer system; the developer generating, with the URI Broker, a URI scheme for a URI; storing the URI scheme; embedding the URI into content; and published the content for a user, wherein, when selected by the user, the URI launches functionality, wherein the functionality does not natively execute based on a URI.

Aspects of the above method include wherein the content is one of a webpage, a document, and an application, and wherein the functionality is one of a web service, an application programming interface (API), and an application.

Aspects of the above method include wherein the URI is embedded in the content as metadata.

Aspects of the above method further comprise: the developer creating a first preference for which functionality to execute based on the URI; and storing the URI scheme and the first preference in a data store associated with a server in communication with the developer computer system through a network, wherein the functionality is launched based on the first preference.

Aspects of the above method include wherein the URI has different visual indicia in the content.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop typically includes pictures, called icons, which show applications, windows, cabinets, files, folders, documents, and other graphical items. The icons are generally selectable through user interface interaction to allow a user to execute applications or conduct other operations.

The term "display" refers to a portion of a screen used to display the output of a computer to a user.

The term "displayed image" refers to an image produced on the display. A typical displayed image is a window or desktop. The displayed image may occupy all or a portion of the display.

The term "module" as used herein refers to any known or later developed hardware, software, firmware, artificial intelligence, fuzzy logic, or combination of hardware and software that is capable of performing the functionality associated with that element.

The term "window" refers to a, typically rectangular, displayed image on part of a display that contains or provides content different from the rest of the screen.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "Uniform Resource Identifier" or "URI" and variations thereof, as used herein, refers to a string of characters used to identify a name of a resource. Such identification enables interaction with representations of the resource over a network, typically the Internet, using specific protocols.

The term "device" and variations thereof, as used herein, refers to machine that may include any computing system, computing device, peripheral device, etc., which may perform the functions described herein. The devices may be as described in conjunction with at least FIGS. 10 and 11. Devices that can be advantageously used may include, but are not limited to, a personal computer (PC), which may include but not limited to a home PC, corporate PC, a Server, a laptop, a Netbook, tablet computers, a Mac, touch-screen computers running any number of different operating systems, e.g., MS Windows, Apple iOS, Google Android, Linux, Ubuntu, etc., a cellular phone, a Smartphone, a personal digital assistant (PDA), an iPhone, an iPad, an iPod, an iPad, a personal video recorder (PVR), a set top box, a wireless-enabled Blu-ray player, a television, a SmartTV, wireless enabled connected devices, e-book readers, e.g., a Kindle or a Kindle DX, a Nook, etc., and other such devices that may be capable of text, voice, video communications, etc. Other embodiments may also use devices like Samsung's Smart Window, Google Glasses, Corning's new glass technologies, and other innovations and technologies that may be applicable to the embodiments at present or in the future.

In embodiments, the device is portable. In alternative or additional embodiments, the device has a touch-sensitive display with a graphical user interface (GUI), one or more processors, memory and one or more modules, programs or sets of instructions stored in the memory for performing multiple functions. The user can interact with the GUI through finger contacts and gestures on the touch-sensitive display. In embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable medium or other computer program product configured for execution by one or more processors.

The term "content" and variations thereof, as used herein, can refer to any item of data, which may be experienced, viewed, or used by a user, and which can include an embedded URI. Content can be, for example, a webpage, a document, an application, a video, audio, etc.

The term "data store" or "database" and variations thereof, as used herein, can refer to repository of a set of data and/or data objects. The data may be modeled using structure defined in a database schema. A data store is a general concept that includes not just repositories but simpler data storage such as flat files etc.

The term "Application Programming Interface (API)" and variations thereof, as used herein, can refer to a set of routines, protocols, and tools for building or integrating software applications. An API may express a software component in terms of operations, inputs, outputs, and underlying types. An API can define functionalities that are independent of their respective implementations or target applications, which allows definitions and implementations to vary without compromising the interface to the target application.

The term "processor" or "Computer Processor Unit (CPU)" and variations thereof, as used herein, can refer to the electronic circuitry within a computer that carries out the instructions of a computer program by performing the basic arithmetic, logical, control, and input/output (I/O) operations specified by the instructions. Generally the processor can include, at least, an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers, and other components. When executing the instructions, these three elements of the processor are configured into a unique physical arrangement. Thus, when executing instructions, the processor becomes specially-designed hardware that is different from other computers.

The term "memory" and variations thereof, as used herein, can refer to any technology consisting of computer components and recording media used to retain digital data. Memory can comprise millions of transistors and/or capacitors for storing the digital data. When storing data for the systems and methods described herein, the millions of transistors and/or capacitors are configured into a unique physical arrangement. Thus, when storing data, the memory becomes specially-designed hardware that is different from other computer memories.

The term "metadata" and variations thereof, as used herein, can generally refer to data about data. Metadata can include structural metadata and descriptive metadata. Structural metadata is data about the containers of data. Descriptive metadata uses individual instances of application data or the data content. Generally, metadata can facilitate in the discovery of relevant information, more often classified as resource discovery. Metadata also helps organize electronic resources, provide digital identification, helps support archiving, and preservation of the resource. Metadata assists in resource discovery by allowing resources to be found by relevant criteria, identifying resources, bringing similar resources together, distinguishing dissimilar resources, and giving location information. URIs may be stored as metadata in content.

The term "messaging" or "instant messaging (IM)" and variations thereof, as used herein, can refer to a set of communication technologies used for text-based communication between two or more participants/devices over the Internet or other types of networks. An "IM chat" can occur in real-time. An online chat and instant messaging differs from other technologies, such as email, because IM is a real-time communication by the users. Some systems permit messages to be sent to users when those recipients are "offline", by sending the message to an associated email account.

The term "text messaging" and variations thereof, as used herein, refers to sending and receiving short text messages using the Short Message Service (SMS). Text messaging is the act of typing and sending a brief, electronic message between two or more devices over a phone or other network. Text messaging can encompass messages containing images, videos, and sound content, which may be known as Multi-media Messaging (MMS).

The term "PSTN (Public Switched Telephone Network)" and variations thereof, as used herein, refers to the world's circuit-switched telephone networks that are operated by national, regional, or local telephony operators, providing infrastructure and services for public telecommunication. The PSTN consists of telephone lines, fiber optic cables, microwave transmission links, cellular networks, communications satellites, and undersea telephone cables, all interconnected by switching centers, thus allowing any telephone in the world to communicate with any other. Originally a network of fixed-line analog telephone systems, the PSTN is generally digital and can include mobile and fixed telephones.

The term "PBX (Private Branch Exchange)" and variations thereof, as used herein, refers a telephone exchange that serves a particular business or office, as opposed to one that a common carrier or telephone company operates for many businesses or for the general public. PBXs make connections among the internal devices of a private organization, usually a business, and also connect them to the PSTN via trunk lines. The general term "extension" is used herein to refer to any end point on the branch because an end point can include telephones, fax machines, modems, and more.

The term "application" or "app" and variations thereof, as used herein, refers to any piece of software code where the embodiments are incorporated or embodied. The software application can be implemented in a standalone configuration or in combination with other software programs and is not limited to any particular operating system or programming paradigm described herein. Thus, the embodiments cover all applications and user interactions described herein.

The term "system" and variations thereof, as used herein, refers to any device or suite of two or more devices that can be programmed and/or configured to carry out, automatically, the operations and processes described herein.

The phrase "in communication with" and variations thereof, as used herein, refers to a communicative connection or coupling between two or more devices. The communication may be conducted through, or in accordance with, any system, protocol, standard, technology, network, etc. that allows two or more devices to interact. The interaction can be through a wired or wireless interface. Further, the communication connection allows for the exchange of data, code, directives, etc. that allow the device to conduct the methods, processes, or operations described herein.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The attached figures are provided for illustrating embodiments. However, the attached figures do not limit the claims as other arrangements, configurations, implementations, etc. are possible, even modifications that change what is shown in the figures. Provided below is a non-limiting description of the attached figures:

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of systems and methods for managing actions presented in a URI. The system can include one or more devices, which can be a communications device, such as a cellular telephone or other smart device, or can include one or more or computing systems, which can be desktop computers, laptop computers, server computers, notebooks, etc. The system can receive content with URI embedded or included in the content. Content can be any software application or program, webpage, document, etc. that can include a URI. If a user interacts with the URI in the content, the system can intercept the user interaction, interpret the URI, and cause another application, web service, Application Programming Interface (API), etc. act on or execute functionality associated with the URI. The overall design and functionality of the system provides for an enhanced user experience making the system and the URIs more useful and more efficient.

Figure 1:
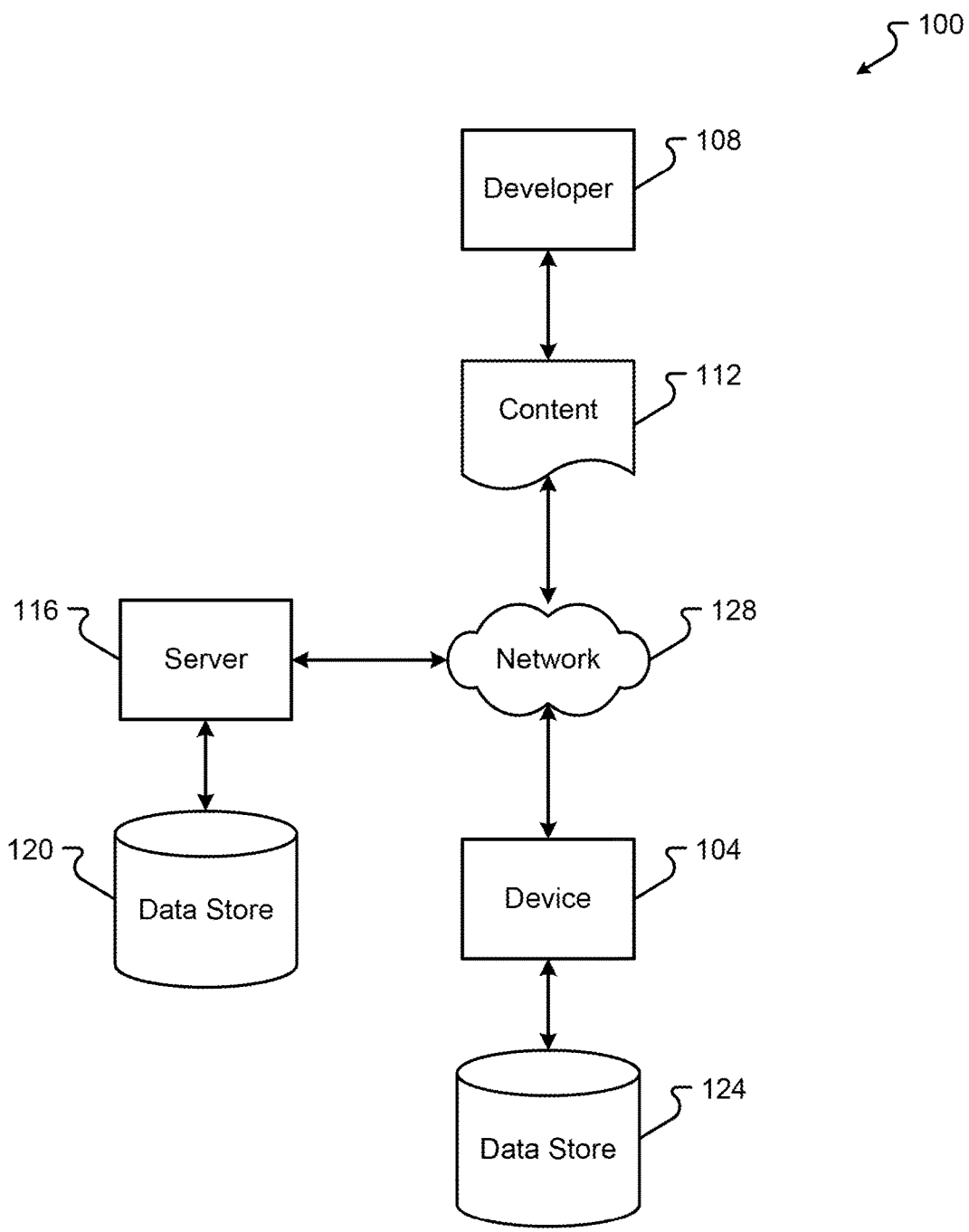
FIG. 1 is a block diagram of an embodiment of a system for implementing a URI scheme.

System Features:

An embodiment of a system 100 that may conduct the operations and processes described herein is shown in FIG. 1. The system 100 can include several different computing devices or computing systems as defined herein. These computing systems may include a user computing device or system 104, a developer computing device or system 108, and a server computing device or system 116. These computing devices may be as described herein, in conjunction with FIGS. 10 and 11 or elsewhere herein.

Each of the different computing devices 104, 108, 116 may be in communication through a network 128. The network 128 can be any collection of systems or device that are communicatively coupled or connect by communication lines and/or wireless links, using various protocols, software, etc., as described in herein, that allow the developer computing system 108 to provide information to the user computing device 104, and the server communicating device 116 to communicate with the user computing device 104.

The server computing system 116 may be in communication with a data store 120 and the user computing device 104 can be in communication with data store 124. The data stores 120, 124 can be any system, device, memory, etc. using any technology to store, manage, retrieve, etc. data or code associated with the software or processes described herein. Generally, the data store includes a memory array operable to persist a value in one or more transistors. Upon storing data within the memory array, the memory array assumes a unique configuration, which makes the memory array specially-configured or specially-designed hardware. Indeed, once data is stored in the memory array, the memory array will function and be physically different from any other memory array.

The data store 120, 124 may store different information or data in a database or other type of data storage system. The data store 120 can store user preferences, developer information, or other information used to both create and embed the URIs and also to implement those URIs when the user computer 104 receives content 112. Similarly, the device 104 for the user may be in communication with computer store 124 that may store the same or similar information as data store 120.

When functioning, the system 100 may allow the developer computing system 108 to send content 112 (e.g., a document, an application, a web page, etc.) to the user device 104. The user device 104 may then read, execute, or present the content 112 on a display, in communication with the device 104, for the user. The content 112 may include an embedded URI, which may include an action in the syntax to perform a function associated with an application, a web page, or other functionality. The computing system 104 may allow the user to select the URI to execute functionality that is directed by the syntax of the URI.

Figure 2:
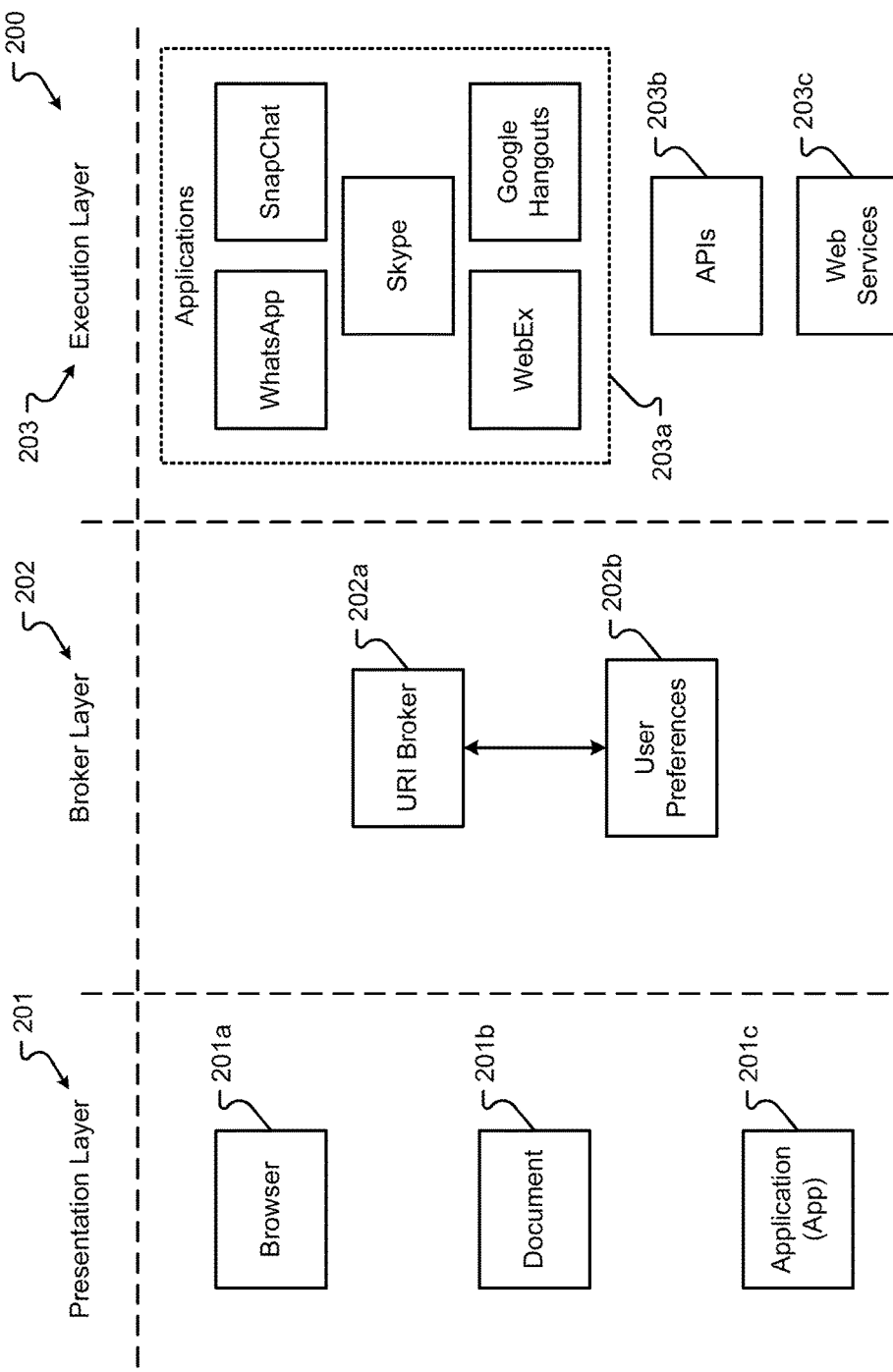
FIG. 2 is a block diagram of an embodiment of a software and/or hardware architecture for implementing a URI scheme.

Hardware, Software, and/or Firmware Features:

An embodiment of a software architecture including one or more modules is shown in FIG. 2. The modules may be embodied as software, firmware, or specially-designed hardware. If embodied as software, the software modules are not limited to any particular software language described or implied in the figures and that a variety of alternative software languages may be used for implementation.

The systems, modules, methods described herein may be embodied on a computer readable medium or computer program product. Further, the modules may be entirely hardware embodiment, entirely software (including firmware, resident software, micro-code, etc.), or a combination of software and hardware.

The modules may execute or operate either solely or partly on the server 108 (or a cluster of servers), on the user's computer or device 104, as a software package or web service, on a remote computer, or any other system, device, computer system, etc. Any of these systems, devices, computer systems, etc. may be as described hereinafter in FIGS. 10 and 11.

FIG. 2 shows an embodiment of the software architecture 200, which can include three layers 201, 202, 203. The first layer 201 may be the Presentation Layer 201, which can include one or more of, but is not limited to, a webpage that may be viewed via a browser 201a, a document (e.g., an MS Word document or an MS PowerPoint presentation 201b), and/or an app (e.g., a video game that is played on a mobile device like a Smartphone 201c).

A computer executing a browser, also referred to as a Web Client or client, can receive and read hypertext data or code when communicating with a Web Server via a data transfer protocol, such as a Hypertext Transfer Protocol (HTTP). Web Clients and Web Servers can uniquely identify Hypertext files, on the web, by a URL. Many hypertext files are generated using the Hypertext Mark-up Language (HTML), which may also be used for calling hypertext data objects. A hypertext data object may include any information medium including, but not limited to, a text, an image, a voice file, a moving picture, or an executable computer program. When a client requests a hypertext file, using the file's URL, the file is displayed on the client's web browser, where the display is commonly known as a webpage. Further, the client can return data to the server and call a Common Gateway Interface (CGI) program on the server computer to perform a specific task.

The second layer is the URI Broker Layer 202, which may include the URI Broker 202a and, optionally, user preferences 202b that define which apps to invoke when processing an interaction with a particular URI.

The third layer is the Execution Layer 203, which can include apps 203a, e.g., Whatsapp, Skype, Google Hangouts, WebEx, SnapChat etc., APIs 203b, e.g., XMPP Chat Libraries, Computer Telephony Integration (CTI), APIs from PBX vendors and Web Services 203c, e.g., Twilio APIs, Salesforce.com (Chatter), and/or APIs that are invoked when a user clicks the URI.

Figure 3:
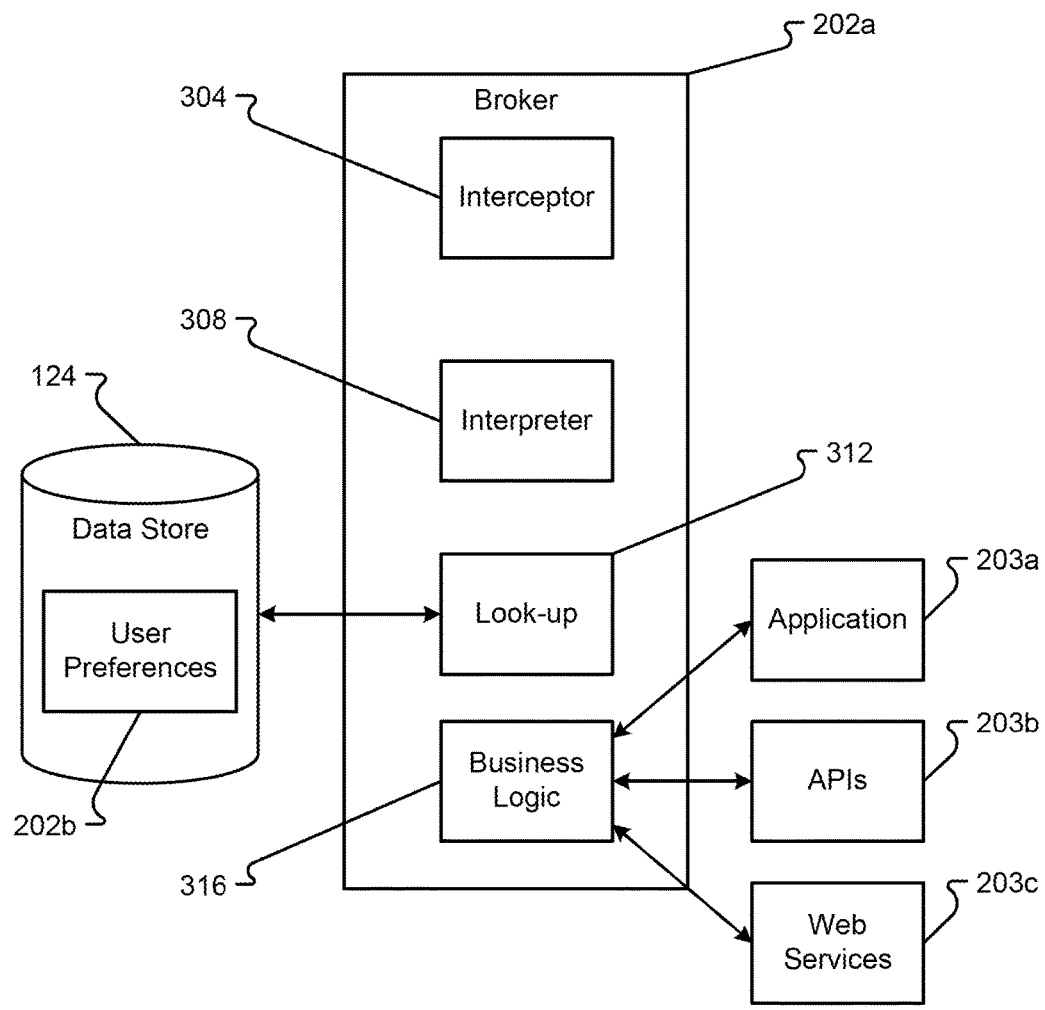
FIG. 3 is a block diagram of an embodiment of the software and/or hardware of a URI Broker.

An embodiment of a URI Broker 202a may be as shown in FIG. 3. Here the URI Broker 202a may be executed by a processor or hardware of and within the user device 104. When executing the URI Broker 202a, the processor assumes a unique configuration that allows the user device 104 to execute functionality directed by the URIs. When in the unique configuration, the processor is physically changed as the transistors, gates, registers, etc. are configured specifically to execute the software functionality. In this way, the processor assumes a physical configuration that is different from any other processor and converts the processor into specially-configured or specially-designed hardware.

The URI Broker 202a can include one or more different modules that configure the hardware and memory of a computing system to execute certain functionality, as described herein. For example, the URI Broker 202 may include an intercept module 304 and interpret module 308, a lookup module 312, and a business logic model 316. The intercept model 304 can intercept user interface actions that select URIs within the content 112. For example, when a user selects a URI presented in a document, the intercept module 304 may intercept the user interface interaction in a register or processor execution stack to change the functionality requested or present the functionality requested by the user. This interception can be conducted by an agent or other code registered to receive information about different user actions or selections that are presented in the processor executable stack. When a URI is presented in one of those executable actions, the intercept module can then read that information and change or stop the performance of that user input. The intercept module 304 may then send this information to the interpret module 308.

The interpret module 308 can determine what type of functionality was selected and parse the URI tag that was provided by the intercept module 304. This parsing may include determining the type of action that is requested by the user and any other information that may be included with the URI. The parsed information may then be sent to the lookup module 312.

The lookup module 312 can determine what the associations are assigned for the action included in the URI. Thus, the lookup module may access a data store 124, which may be local to the device 104, or may send information or a request, through a network 128 to a server 116, to determine the association of the URI action with the associated application 203a, web service 203c, API 203b, etc. in which the URI information needs to be sent. The lookup information may then be sent to, received by, or retrieved by the lookup module 312. Any retrieved information about the URI may then be sent to the business logic module 316.

The business logic module 316 may send the parsed information to an application 203a, an API 203b, or a web service 203c, or other destination based on the information provided by the lookup module 312. Thus, the lookup module 312 can determine where the information or the URI needs to be sent while the business logic module 316 sends that information to the appropriate destination.

An API 203b can be any kind of interface to another application 203a. Thus, the API 203b can function as intermediary code that allows for the translation of the URI information from the business logic module 316 into a form required by the executable application 203a. Further, the API 325 may help with initiating certain functionality, such as starting and/or configuring an application before the URI information is passed to the executable application 203a.

The executable application 203a may be any type of software or computer functionality executed either locally on a device 104 or by a server 116. The executable application 203a can use the information in the URI to conduct the action as required by the URI.

A web service 203c can be any type of functionality accessed through the Internet or a network 128, either from a server 116 or other third party system. Thus the web service 203c provides further extendable functionality for the URIs.

Figure 4:
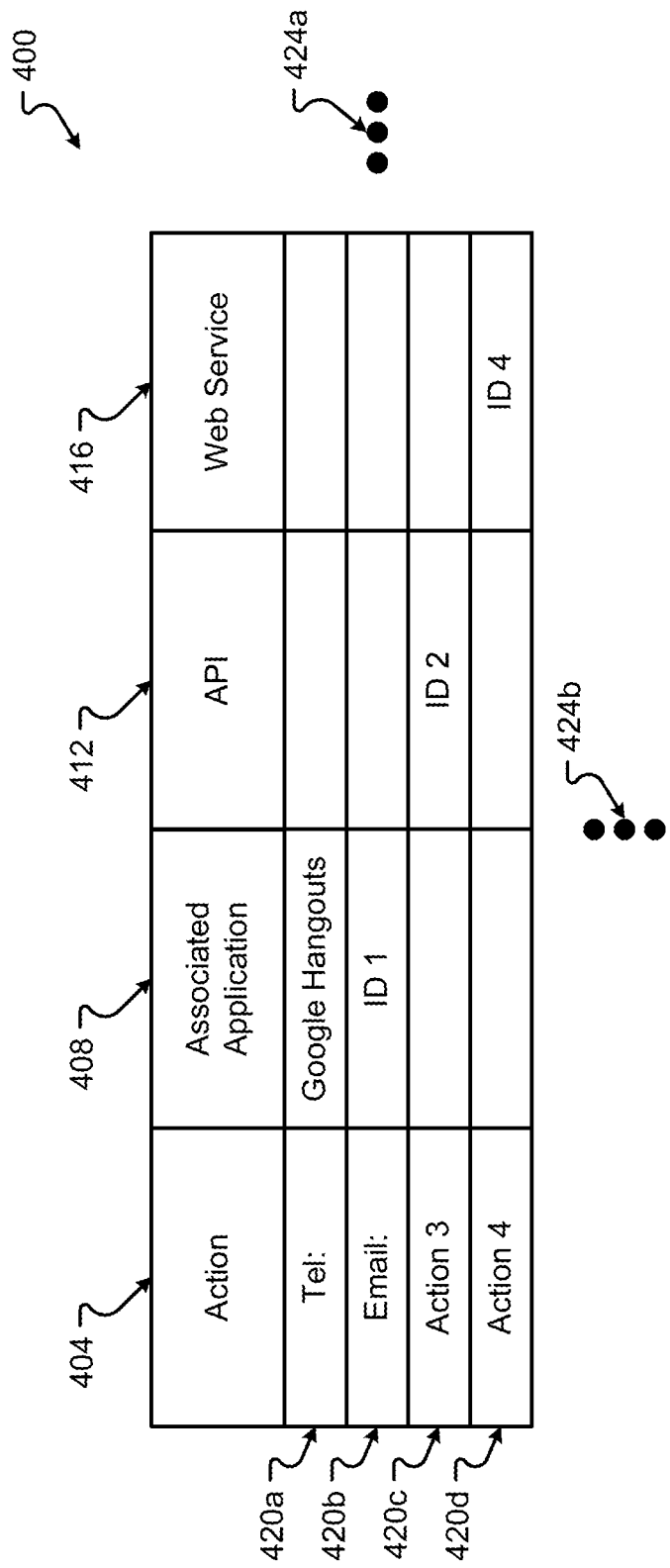
FIG. 4 is a table representing an embodiment of a data structure that stores user preferences for associating URI schemes with functionality.

Data Structures and Memory Configurations:

An embodiment of a data store 400 for storing associations between actions included in an URI and the associated application's API, or web services as shown in FIG. 4. This data store appears as a flat file database, but may be any type of database, including an object-oriented database, a relational database, or other type of databases. Each of the associations may be interpreted in different ways, based on the type of database. While a layout, arrangement, and selection of data are provided in FIG. 4, the data store 400 can have more or fewer columns, be arranged differently, or provide more or less data as represented by ellipses 424a and 424b.

The data store 400 may have one or more columns 420 that are associated with different actions that may be listed as shown in column 404. Each type of action 404 may be listed as a separate entry, for example, telephone call action, messaging action, etc., may be listed as the actions within column 404.

Each different action may have a different row 420. Within each row, each action may have an associated application 408, API 412, web service 416, etc. that is the default or user-assigned application 408, API 412, web service 416 to use with the action listed in column 404. For example, if the URI includes a telephone number and a telephone action, the user may associate GoogleChat with the telephone action, in which case a URI that is selected with the telephone action may cause the GoogleChat application to be executed and call the phone number listed in the URI. The associated applications generally can be any application on the user device or server in communication with the user device 104.

Generally, these associated applications may be applications that don't normally function with URIs. Thus, using this novel new approach in using URIs, new and more user-friendly applications may be used to conduct actions in the URIs. If an application requires a more complicated interface to conduct an action in a URI, an API 412 can be created to provide the required interface for the application. In this way, the functionality of the URI schema is propagated to new applications that could not previously respond to a selection of a URI.

It may be in some situations where the associated application 408 is not used, but rather the action is sent to an API 412 or a web service listed in column 416. The API 412 may then be used to execute the action listed in 404 by interfacing with an application. The web service 416 may function similarly to the applications, using an address or some other information in the user preferences or the URI for both locating and executing the web service listed in column 416.

Figure 5:
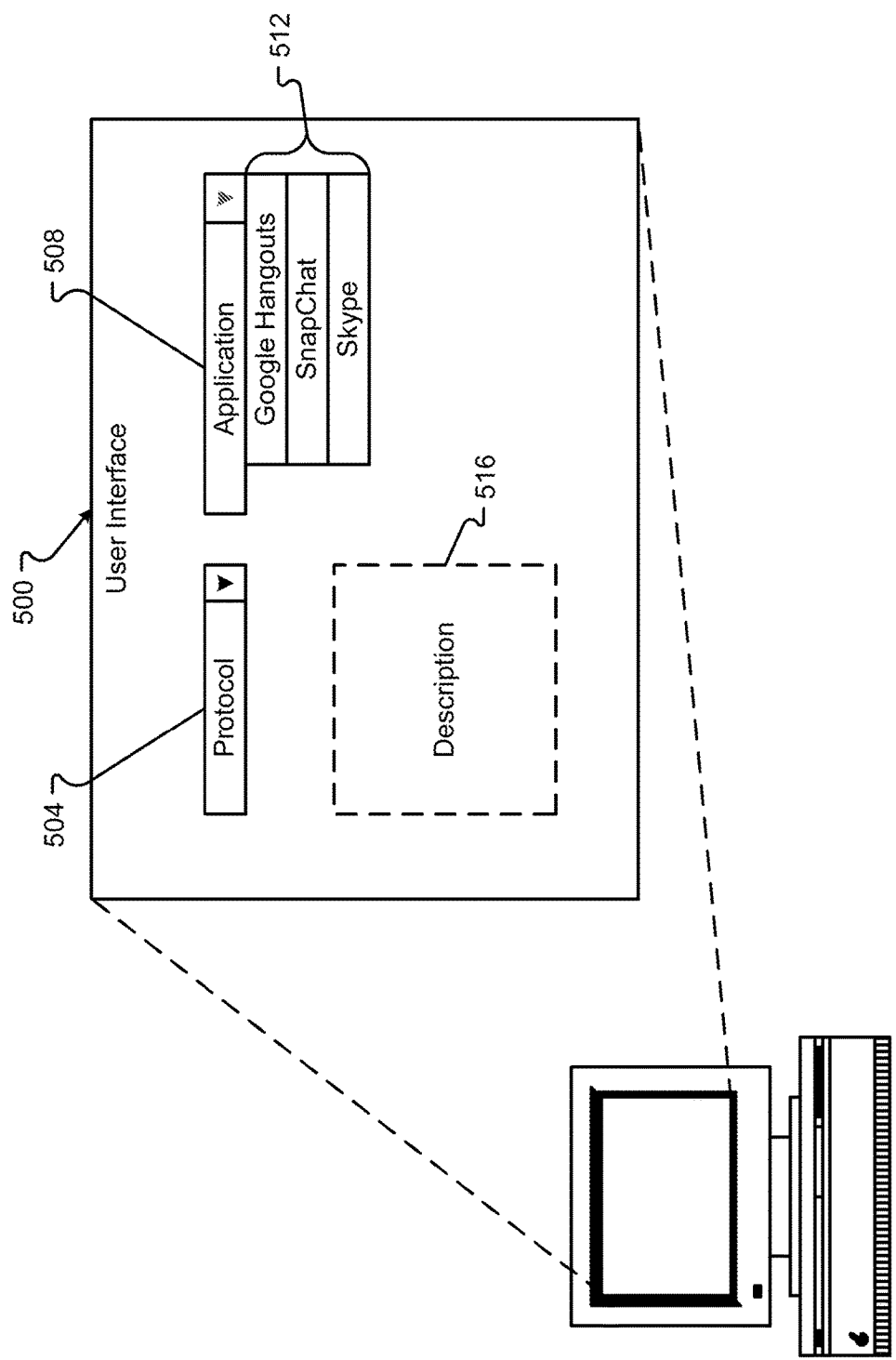
FIG. 5 is a representation of an embodiment of a user interface that allows a user to input user preferences.

User Interface Configurations and Interactions:

An embodiment of a user interface 500 used to enter user preferences may be as shown in FIG. 5. The user interface 500 may be used by a user to set user-selected preferences for which applications are to be associated with particular actions included within the URI schema. The protocol 504 may include a list that is provided from a selectable menu icon or in a presentation as shown in section 504. The protocol 504 can be any action listed within column 404 of the data store shown in FIG. 4 or any action that may be included in a URI. Thus, the protocol 504 can be a telephone protocol, a messaging protocol, etc. Each protocol 504 may have a separate user interface 500 or the section 504 may present a drop-down menu, a pop-up menu, or some other type of interface to allow the user to select which protocol 504 she or he wants to assign with user preference.

Likewise, the user selectable button or device 508 may be presented, which can list one or more apps, APIs, web services, etc., that the user can associate with the protocol listed in section 504. For example, when selecting user interface device 508, a menu 512 may be presented with one or more applications, which may be the same as those that can be listed in column 408 of data store 400 in FIG. 4 or that may be used to execute an action in a URI. The URI Broker 202a may be able to determine which applications can be associated with which protocol and pre-populate the menu 512. In addition or in the alternative, a complete list of applications may be made for the menu (i.e., the list can include applications not installed on the current device but may be used by other computers or users) allowing the user to select any of the applications currently executing on their device or known to perform the action selected. The applications listed in menu 512 may be a precompiled list that is pre-populated by the developer or software. Section 516 can include a description of the protocol 504 to allow the user better understanding what the protocol listed in section 504 does or is meant to do.

It must be noted that is possible that a user or the software can create a hierarchical arrangement of application capable of performing an action in a URI. Thus, the user or the developer may be able to assign a primary application and the list one or more non-preferred applications to execute the action. In this way, the action may still be performed even if the preferred application is not functioning.

System Functionality and Processes:

A URI is a string of characters used to identify a name of a resource and this identification enables interaction with representations of the resource over a network, typically the Internet, using specific protocols. Schemes specify a concrete syntax, and associated protocols define each URI. The most common form of URI is the uniform resource locator (URL), frequently referred to informally as a web address. More rarely seen in usage is the uniform resource name (URN), which was designed to complement URLs by providing a mechanism for the identification of resources in particular namespaces.

The string of characters in the URI can identify resources in the web, for example, documents, images, downloadable files, services, electronic mailboxes, and other resources. The URI can make resources available under a variety of naming schemes and access methods, such as, HTTP, FTP, and Internet mail, which are addressable in the same way. It is an extensible technology with a number of existing addressing schemes.

A URI scheme is the top level of the URI naming structure, e.g., HTTP, FTP, tel:, etc. All URIs and absolute URI references are formed with a scheme name, followed by a colon character (":"), and the remainder of the URI called the scheme-specific part. The syntax and semantics of the scheme-specific part are left largely to the specifications governing individual schemes, subject to certain constraints, such as, reserved characters.

The most common URI formats are prefixed with identifiers, such as HTTP/FTP, to indicate the type of content to the browser or presenting application. In addition, non-content (action-based) identifiers, such as "mailto:" or "tel:," indicate the ability to send e-mail or call a phone number using the post-fixed data (e.g., "mailto:developer@esna.com" sends and email to the "developer@esna.com" email address; "tel:9057079700" makes a phone call to the phone number (905) 707-9700). The browser or host operating system can determine how the action is interpreted using some type of browser functionality or by invoking another application running within the computing system environment. The recipients of the invocation are termed "handlers" (i.e., having the ability to handle provided information content in a relevant and functional manner). Examples of handlers can include one or more of, but are not limited to, e-mail applications (e.g., Microsoft Outlook or Mozilla Thunderbird) having the ability to handle "mailto:" links, or desktop applications (e.g., Skype or X-lite) being able to handle "tel:" to initiate phone based dialing and audio calling capabilities.

A URL (Uniform Resource Locator) is a URI that, in addition to identifying a web resource, specifies the means of acting upon or obtaining the representation, specifying both its primary access mechanism and network location. A URN (Uniform Resource Name) is a URI that identifies a resource by name in a particular namespace. A URN functions like a person's name, while a URL resembles that person's street address. In other words: the URN defines an item's identity, while the URL provides a method for finding it. In embodiments, the URI may be a standard URI while in the alternative the URI may be a non-standard URI.

Figure 6:
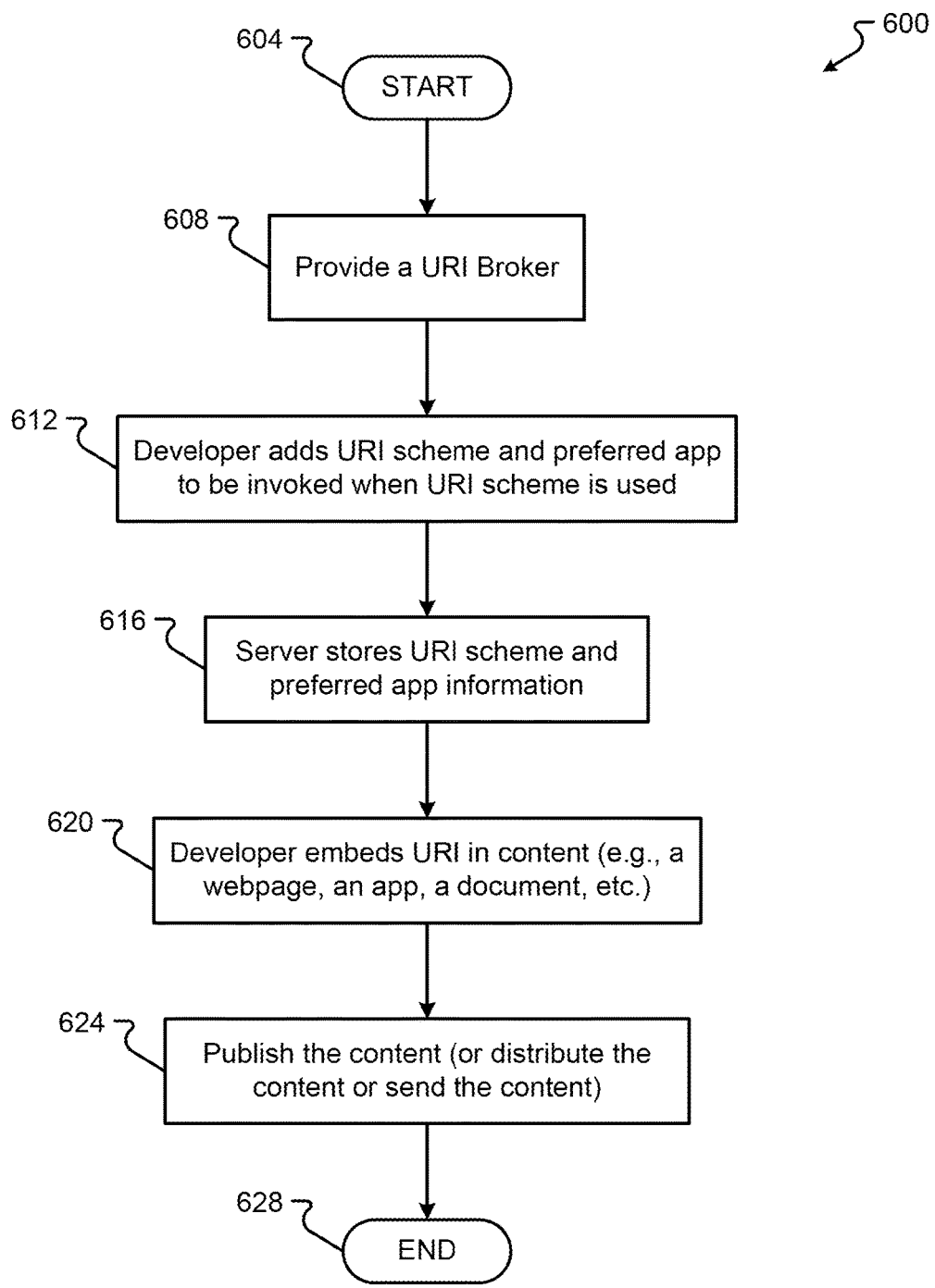
FIG. 6 is a flow chart of an embodiment of a method for publishing content with an embedded URI.

FIG. 6 shows an embodiment of a method 600 for providing a mechanism that allows developers to create and embed a URI in content (e.g., HTML, a document, an app, etc.) to invoke an application according to a URI scheme name. While a general order for the steps of the method 600 is shown in FIG. 6, generally, the method 600 starts with a start operation 604 and ends with an end operation 628. The method 600 can include more or fewer steps or can arrange the order of the steps differently than those shown in FIG. 6. The method 600 can be executed as a set of computer-executable instructions, executed by a computer system, and encoded or stored on a computer readable medium. Further, the method 600 can be executed by a gate or other hardware device or component in an Application Specific Integrated Circuit (ASIC), a Field Programmable Gate Array (FPGA), or other type of hardware device. Hereinafter, the method 600 shall be explained with reference to the systems, components, modules, software, data structures, user interfaces, etc. described herein.

Many software applications, web services, etc., do not natively have the capability to handle URIs. In embodiments, the systems and methods described herein advantageously use chat or audio/video calling services, by responding to a user clicking a URI by launching applications that do not natively support the URI. A URI Broker 202a is provided at the developer system 108, a server 116, and/or a user device 104 to facilitate the embedding and reading of the URIs, in step 608. The URI Broker 202a can be as described herein.

The developer 108 can access an API or other development tool, associated with the URI Broker 202a, to create the URI scheme, in step 612. In developing the URI, the developer 108 creates a scheme for the URI—an action, a resource to use, and/or other information. The developer 108 can provided a preferred application to use for the action in the URI scheme. For example, the developer can provide a name for the application to be initiated for the action. Thus, the developer 108 can define the URI elements or tags, set preferences for which application is to be executed when the user selects the URI, define any data that is to be associated with the URI (e.g., a phone number, email address, etc.), or define other fields or tags in the URI. In embodiments, the developer may also create new actions for functionality that has not been used with a URI or is yet to develop.

The scheme and preferences created by the developer 108 may be stored in a data store or server, in step 616. The scheme and preference may be stored at the developer server 108 or a server 116 unassociated with the developer 108. Thus, the developer's URI information may be stored in data store 120, as described above, and made accessible by one or more users when selecting the embedded URI. The URI information may also be stored in other locations or may be duplicated at other locations.

A URI (e.g., "a tel:" URI) may be embedded, by a developer 108 using the provided URI Broker 202a, in an app (e.g., in a video game) as an app URI, in step 620. When a user clicks the embedded URI the user's device 104 conducts an action (e.g., initiates a call to the developer's office phone number) using another app (e.g., a calling application (e.g., GoogleChat) specified in the URI, a default calling application, or a calling application that is listed as preferred by the user or the developer). Generally, the app is being used (e.g., the video game is being played) on the user's device when the URI is clicked or selected.

In another embodiment, the URI may be embedded in a document (e.g., an MS Word document) and, when a user selects the URI in the document, another application initiates an action using the other application on the user's device. In yet another embodiment, the URI may also be advantageously embedded in an email and/or other electronic text communications (e.g., a signature block of an email message). In many email applications, a signature or signature block allows a user to set one or more lines of custom text that are automatically appended to the messages. Generally, a signature is used to provide the recipient with the senders name, e-mail address, business contact information, or website. The signature can include text or graphic images. Any of these elements of the signature block may be associated with a URI. The URI may be stored as metadata associated with the message. When selecting the text associated with the URI, the URI Broker 202a can intercept the selection and provide the functionality associated therewith. To alert the user that a URI is associated to some portion of the document, the text may have unique visual indicia (e.g., a different font color, underlined, italicized, bolded, different font size, etc.).

Optionally, the developer can publish an HTML page or the content, in step 624. The process of putting the code for a website on the Internet may be referred to as publishing. Alternatively or additionally, content may be published by providing access to the document, application, or other content that includes the embedded URI. Thus, the content may be published to the Internet or may be accessed through application stores, file servers, etc. The content for websites are generally stored on servers that run special software that allow those servers to be able to serve web pages to whichever system requests them. Thus, whenever a user types www.google.com into a web browser, the server that stores the data for www.google.com sends the content (in the form of code) of that website's home page to the web browser. The web browser then converts that code into something meaningful that appears on the screen where the web browser may be running (e.g., a SmartPhone or a computer).

The Internet web pages are served by a DNS (Domain Name Server) system. DNS is a system that contains a large database of all the websites in the world together with the IP address of the servers where the website data is stored. When a user types a web address into a web browser, the browser takes the domain name, looks up the domain name with the DNS system, receives an Internet Protocol (IP) address from the DNS, connects to the server associated with the IP address, receives the website file for the user, converts the data in the website file into meaningful data that is displayed on the screen of the device where the web browser is running Users access the HTML page(s) or engage with the app with the embedded URI, and then can select or click the URI to invoke another app too initiate a service or functionality (e.g., a telephone call, a video chat, text messaging, instant messaging, etc.)

Figure 7:
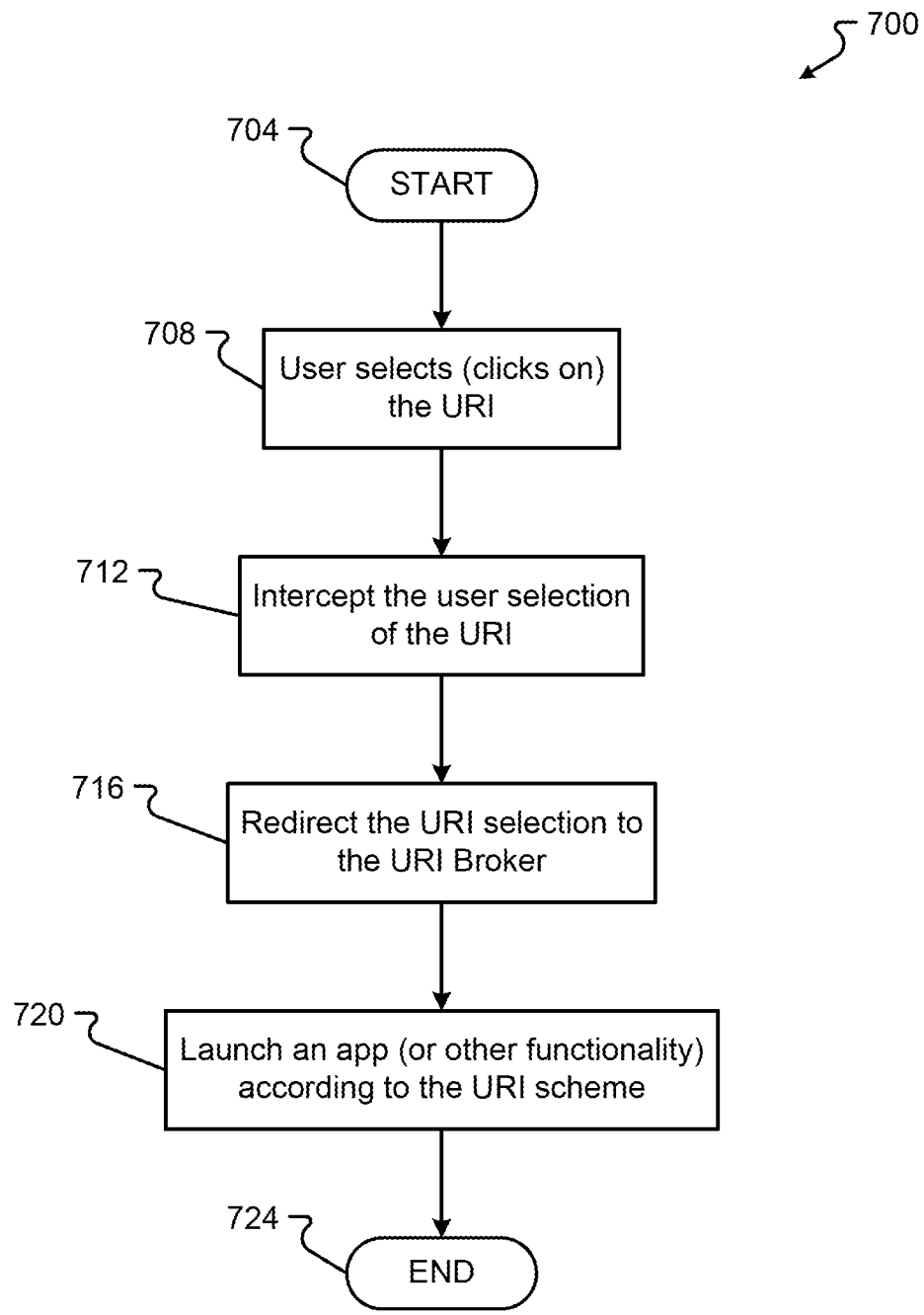
FIG. 7 is a flow chart of an embodiment of a method for redirecting user selections of a URI based on a URI scheme.

FIG. 7 shows an embodiment of a method 700 for executing an action provided in a URI based on a user selection of the URI. While a general order for the steps of the method 700 is shown in FIG. 7, generally, the method 700 starts with a start operation 704 and ends with an end operation 724. The method 700 can include more or fewer steps or can arrange the order of the steps differently than those shown in FIG. 7. The method 700 can be executed as a set of computer-executable instructions, executed by a computer system, and encoded or stored on a computer readable medium. Further, the method 700 can be executed by a gate or other hardware device or component in an Application Specific Integrated Circuit (ASIC), a Field Programmable Gate Array (FPGA), or other type of hardware device. Hereinafter, the method 700 shall be explained with reference to the systems, components, modules, software, data structures, user interfaces, etc. described herein.

A user may select a URI in an item of content, in step 708. For example, a user can manipulate an input device (e.g., a keyboard, mouse, etc.) to select a URI from a document, application, webpage, etc. The URI may be highlighted or have different visual indicia indicating that the URI is selectable. Thus, the user can "click" on the URI. In one example, the URI is embedded in a webpage that is being displayed in a browser application running on a computing device like a Smartphone; the user may use a touch gesture to click on the URL. In another example, the URI may be embedded in a Microsoft Word document that is being edited in MS Word application running on a desktop computer; the user may employ a left-mouse click to interact with the URI.

The URI Broker 202a may then intercept the selection of the URI, in step 712. In embodiments, browser extension technology resident on the user device 104 can intercept the URI selection before execution any action on the URI. Browser extensions enable the capability to analyze and intercept web page content for the benefit of application feature functionality. Alternatively or additionally, an interceptor 304 in the URI Broker 202a can intercept the web page content or may intercept the selection from a register or execution stack of the user device 104.

A function of the URI Broker 202a may then redirect the URI according to mapping resident with or stored in a data store in communication with the URI Broker 202a, in step 716. For example, the interceptor 308 of the URI Broker 202a can provide information about the type of URI that has been selected. The interpretation of the URI may be provided to the Look-up module 312. The Look-up module 312 may then access URI information stored on a data store 120, 124 associated with a server 116 or user device 104 to acquire the assigned mapping according to which the URI is redirected. The retrieved information, including the URI interpretation, developer preferences created by a developer (as described in conjunction with method 600), any user preferences created by a user (as described in conjunction with method 800), and any other information is provided to the business logic module 316.

The business logic module may then launch an app 203a, API 203b, a web service 203c, etc., according to URI scheme name and other information provided by the Look-up module 312, in step 720. In embodiments, the business logic module 316 can an app 203a, API 203b, a web service 203c, etc., as defined in the URI scheme name. Alternatively, the business logic module 316 can an app 203a, API 203b, a web service 203c, etc., based on established preferences provided by the developer 108 or the user 104. Thus, the URI is redirected to an app that is defined in the URI Broker mapping to execute the action.

Figure 8:
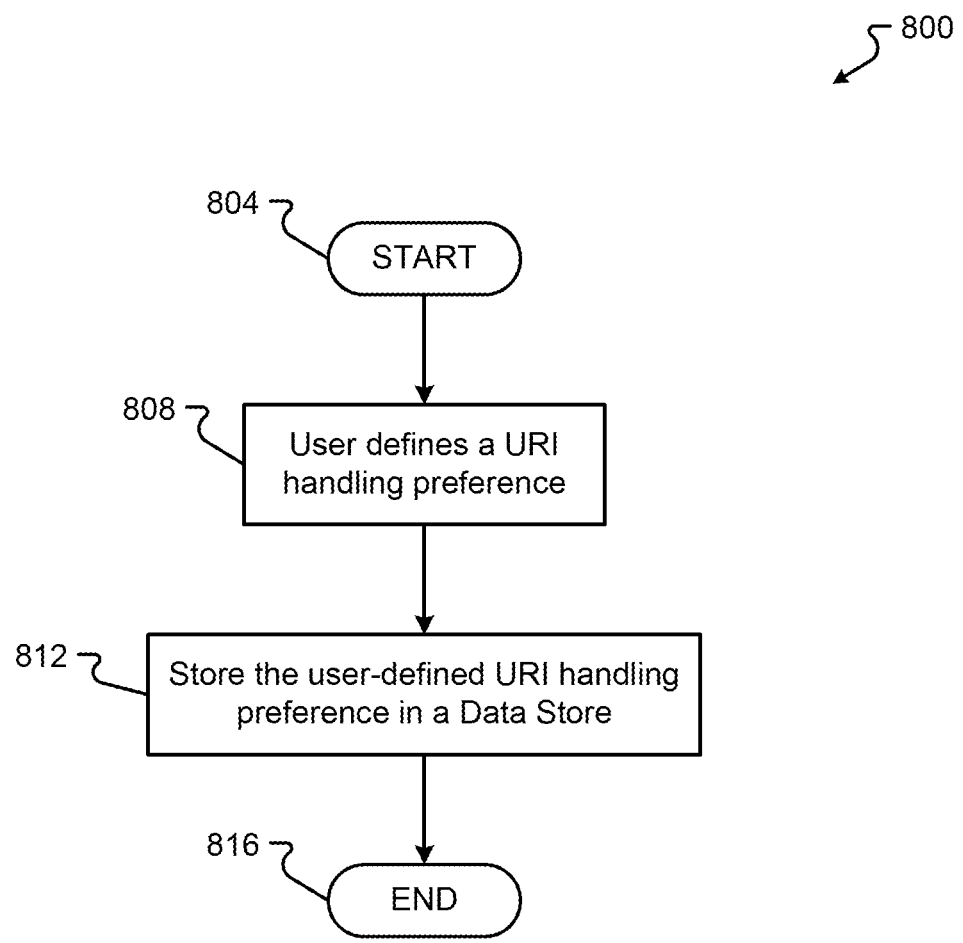
FIG. 8 is a flow chart of an embodiment of a method for assigning user-defined preferences for associating a URI scheme with functionality.

FIG. 8 shows an embodiment of a method 800 for a user setting preferences with respect to a URI. While a general order for the steps of the method 800 is shown in FIG. 8, generally, the method 800 starts with a start operation 804 and ends with an end operation 816. The method 800 can include more or fewer steps or can arrange the order of the steps differently than those shown in FIG. 8. The method 800 can be executed as a set of computer-executable instructions, executed by a computer system, and encoded or stored on a computer readable medium. Further, the method 800 can be executed by a gate or other hardware device or component in an Application Specific Integrated Circuit (ASIC), a Field Programmable Gate Array (FPGA), or other type of hardware device. Hereinafter, the method 800 shall be explained with reference to the systems, components, modules, software, data structures, user interfaces, etc. described herein.

A user can define one or more URI handling preferences, in step 801. In embodiments, there may be more than one app 203a, API 203b, web service 203c, etc., that may be defined in the URI Broker preference mapping that can complete the action being called by the URI. Thus, the user may select one or the plurality of apps 203a, APIs 203b, and/or web services 203c, etc., with the URI Broker 202a to be invoked for completing the action being called by the URI.

The selection may be made in a user interface, as described in conjunction with FIG. 5. In embodiments, the user may override any pre-configured associated between the URI and an app 203a, API 203b, a web service 203c, etc., either set by default or preferred by a developer 104. In this way, the user can achieve the best user experience by using the most preferred app 203a, API 203b, web service 203c, etc., for the URI, even if the app 203a, API 203b, web service 203c, etc. cannot normally react to URIs. Alternatively, the user may not be able to override the developer 108 settings.

The URI Broker 202a may then store the URI handling preferences for the user in a data store 120, 124, in step 802. The user preferences regarding which app 203a, API 203b, web service 203c, etc. to use, when a URI is clicked, is stored in a database 400 that resides in the data store 120, 124 on a server 116 or user device 104 and that is accessible to the user's connected device(s) 104 via the Internet or other network (e.g., a local area network, a wireless network, etc.). The data store 120, 124 may accessible to the operating system and other application installed on the device 104 or executed based on instructions from the device 104.

Figure 9:
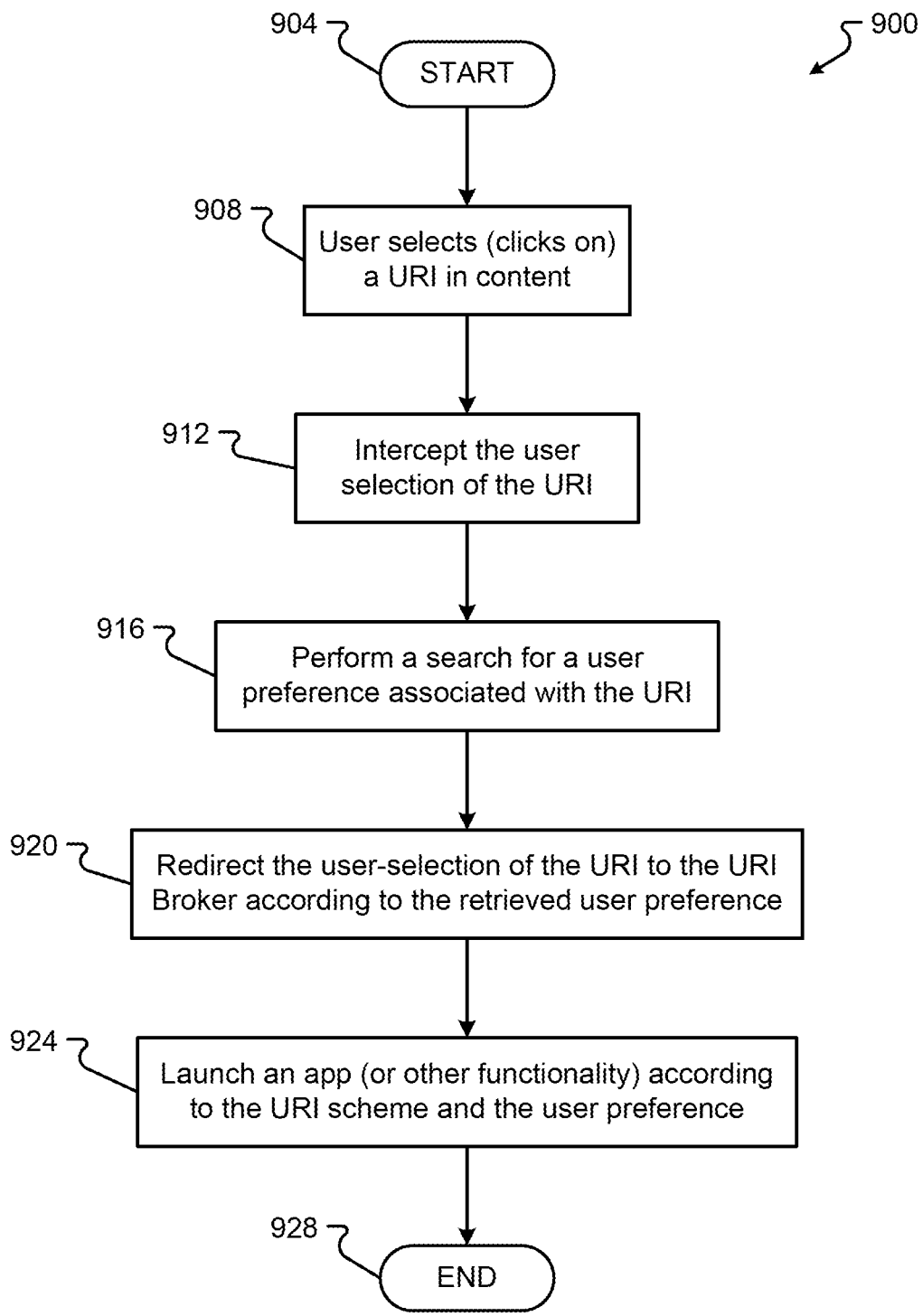
FIG. 9 is a flow chart of an embodiment of a method for redirecting user selections of a URI based on a URI scheme and user preferences.

FIG. 9 shows an embodiment of a method 900 for executing an action listed in a URI based on a user selection of the URI, the URI schema, and user preferences. While a general order for the steps of the method 900 is shown in FIG. 9, generally, the method 900 starts with a start operation 904 and ends with an end operation 928. The method 900 can include more or fewer steps or can arrange the order of the steps differently than those shown in FIG. 9. The method 900 can be executed as a set of computer-executable instructions, executed by a computer system, and encoded or stored on a computer readable medium. Further, the method 900 can be executed by a gate or other hardware device or component in an Application Specific Integrated Circuit (ASIC), a Field Programmable Gate Array (FPGA), or other type of hardware device. Hereinafter, the method 900 shall be explained with reference to the systems, components, modules, software, data structures, user interfaces, etc. described herein.

A user may select a URI in an item of content, in step 908. For example, a user can manipulate an input device (e.g., a keyboard, mouse, etc.) to select a URI from a document, application, webpage, etc. The URI may be highlighted or have different visual indicia indicating that the URI is selectable. Thus, the user can "click" on the URI. In one example, the URI is embedded in a webpage that is being displayed in a browser application running on a computing device like a Smartphone; the user may use a touch gesture to click on the URL. In another example, the URI may be embedded in a Microsoft Word document that is being edited in MS Word application running on a desktop computer; the user may employ a left-mouse click to interact with the URI.

The URI Broker 202a may then intercept the selection of the URI, in step 912. In embodiments, browser extension technology resident on the user device 104 can intercept the URI selection before execution any action on the URI. Browser extensions enable the capability to analyze and intercept web page content for the benefit of application feature functionality. Alternatively or additionally, an interceptor 304 in the URI Broker 202a can intercept the web page content or may intercept the selection from a register or execution stack of the user device 104.

The Look-up module 312 of the URI Broker 202a can perform a search for user preferences, in step 916. In embodiments, the Look-up module 312 may search for user preferences regarding which app 203a, API 203b, web service 203c, etc., to invoke to complete the action being called by the URI. The Look-up module 312 may search data stores 124 associated with the user device 104, data stores 120 associated with a server accessed through a network, or data stores associated with a developer 108 or other system or party. The Look-up module 312 may access a database 400 to find the action provided in the URI in portion 404 of the database. Upon finding the same or similar action, the Look-up module 312 can then determine which app 203a, API 203b, web service 203c, etc., is listed in portions 408-416 that is associated with the action. The associated app 203a, API 203b, web service 203c, etc., may then be retrieved and provided to the Business Logic module 316. In many cases there may be more than one app 203a, API 203b, web service 203c, etc., which may be defined in the URI Broker mapping, that can complete the action being called by the URI. The Look-up module 312 may return to the Business Logic module 316 the list of preferred applications, with a designation of most preferred to least preferred, to allow the Business Logic module 316 to invoke one of the apps 203a, APIs 203b, web services 203c, etc. that has been specified by the user as their more preferred app 203a, API 203b, web service 203c, etc., for completing this action. The Business Logic module 316 may thus ensure the best experience for the user even if the most preferred application is unavailable.

A function of the URI Broker 202a may then redirect the URI according to mapping resident with or stored in a data store in communication with the URI Broker 202a, in step 920. For example, the interceptor 308 of the URI Broker 202a can provide information about the type of URI that has been selected. The interpretation of the URI may be provided to the Look-up module 312. The Look-up module 312 may then access URI information stored on a data store 120, 124 associated with a server 116 or user device 104 to acquire the assigned mapping according to which the URI is redirected. The retrieved information, including the URI interpretation, developer preferences created by a developer (as described in conjunction with method 600), any user preferences created by a user (as described in conjunction with method 800), and any other information is provided to the business logic module 316.

The business logic module may then launch an app 203a, API 203b, a web service 203c, etc., according to URI scheme name and other information provided by the Look-up module 312, in step 924. In embodiments, the business logic module 316 can an app 203a, API 203b, a web service 203c, etc., as defined in the URI scheme name and/or user preferences. Alternatively, the business logic module 316 can an app 203a, API 203b, a web service 203c, etc., based on established preferences provided by the developer 108 and/or the user 104. Thus, the URI is redirected to an app that is defined in the URI Broker mapping to execute the action.

Figure 10:
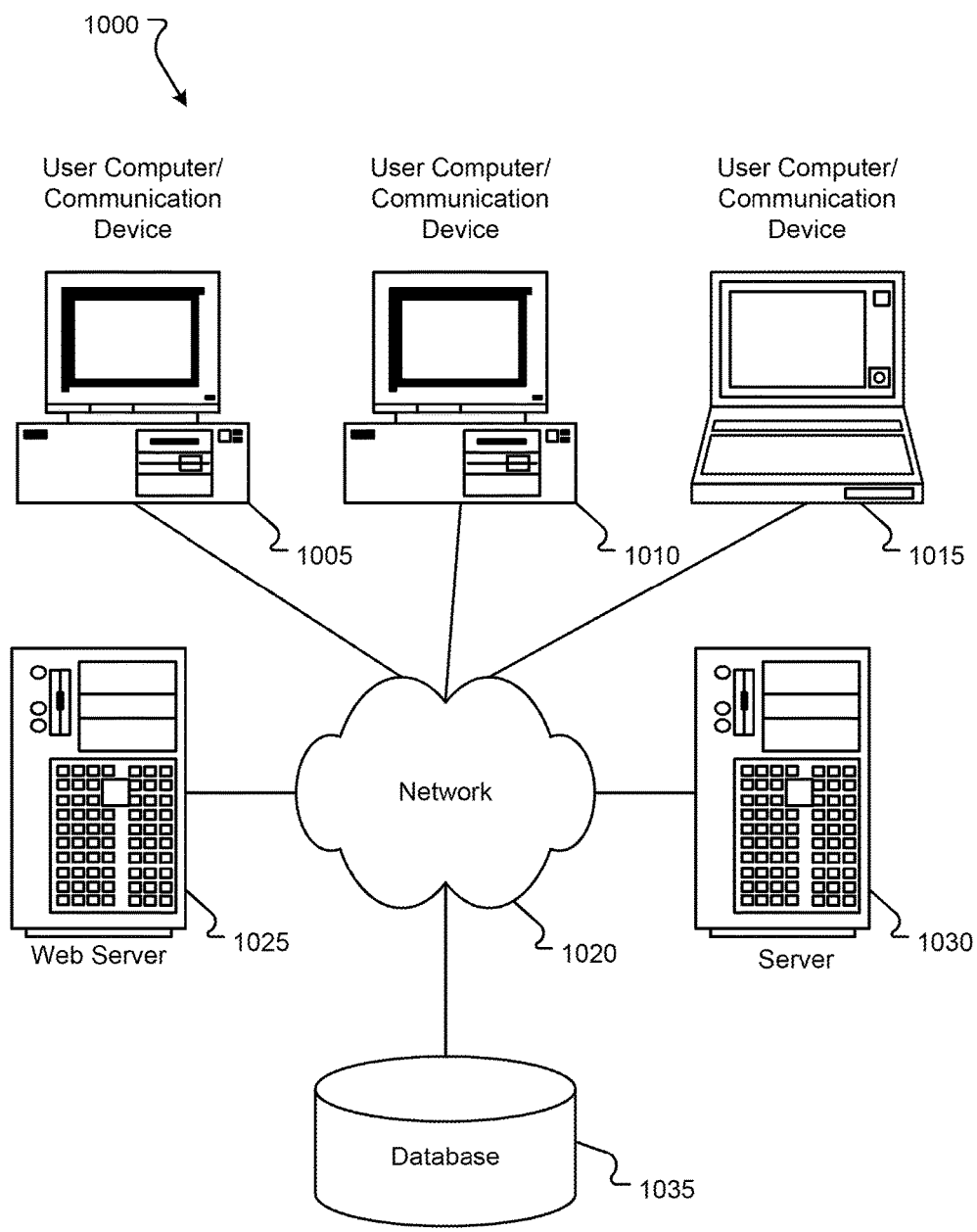
FIG. 10 is a block diagram of an embodiment of a software and/or hardware implementation of the devices, systems, computers, networks, etc. described herein.

FIG. 10 illustrates a block diagram of a system 1000 that may connect parties in a video conference. The system 1000 includes one or more user computers 1005, 1010, and 1015. The user computers 1005, 1010, and 1015 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 1005, 1010, 1015 may also have any of a variety of applications, including for example, database client and/or server applications, and web browser applications. Alternatively, the user computers 1005, 1010, and 1015 may be any other electronic device, such as a thin-client computer, Internet-enabled mobile telephone, and/or personal digital assistant, capable of communicating via a network (e.g., the network 1020 described below) and/or displaying and navigating web pages or other types of electronic documents. Although the exemplary system 1000 is shown with three user computers, any number of user computers may be supported.

System 1000 further includes a network 1020. The network 1020 may can be any type of network familiar to those skilled in the art that can support data communications using any of a variety of commercially-available protocols, including without limitation TCP/IP, SNA, IPX, AppleTalk, and the like. Merely by way of example, the network 1020 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 1025, 1030. One server may be a web server 1025, which may be used to process requests for web pages or other electronic documents from user computers 1005, 1010, and 1020. The web server can be running an operating system including any of those discussed above, as well as any commercially-available server operating systems. The web server 1025 can also run a variety of server applications, including HTTP servers, FTP servers, CGI servers, database servers, Java servers, and the like. In some instances, the web server 1025 may publish available operations as one or more web services.

The system 1000 may also include one or more file and or/application servers 1030, which can, in addition to an operating system, include one or more applications accessible by a client running on one or more of the user computers 1005, 1010, 1015. The server(s) 1030 may be one or more general purpose computers capable of executing programs or scripts in response to the user computers 1005, 1010 and 1015. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 1030 may also include database servers, including without limitation those commercially available from Oracle, Microsoft, Sybase™, IBM™ and the like, which can process requests from database clients running on a user computer 1005.

In some embodiments, an application server 1030 may create web pages dynamically for displaying. The web pages created by the web application server 1030 may be forwarded to a user computer 1005 via a web server 1025. Similarly, the web server 1025 may be able to receive web page requests, web services invocations, and/or input data from a user computer 1005 and can forward the web page requests and/or input data to the web application server 1030.

In further embodiments, the server 1030 may function as a file server. Although for ease of description, FIG. 10 illustrates a separate web server 1025 and file/application server 1030, those skilled in the art will recognize that the functions described with respect to servers 1025, 1030 may be performed by a single server and/or a plurality of specialized servers, depending on implementation-specific needs and parameters.

The system 1000 may also include a database 1035. The database 1035 may reside in a variety of locations. By way of example, database 1035 may reside on a storage medium local to (and/or resident in) one or more of the computers 1005, 1010, 1015, 1025, 1030. Alternatively, it may be remote from any or all of the computers 1005, 1010, 1015, 1025, 1030, and in communication (e.g., via the network 1020) with one or more of these. In a particular set of embodiments, the database 1035 may reside in a storage-area network ("SAN") familiar to those skilled in the art. Similarly, any necessary files for performing the functions attributed to the computers 1005, 1010, 1015, 1025, 1030 may be stored locally on the respective computer and/or remotely, as appropriate. In one set of embodiments, the database 1035 may be a relational database, such as Oracle 10I™, that is adapted to store, update, and retrieve data in response to SQL-formatted commands.

Figure 11:
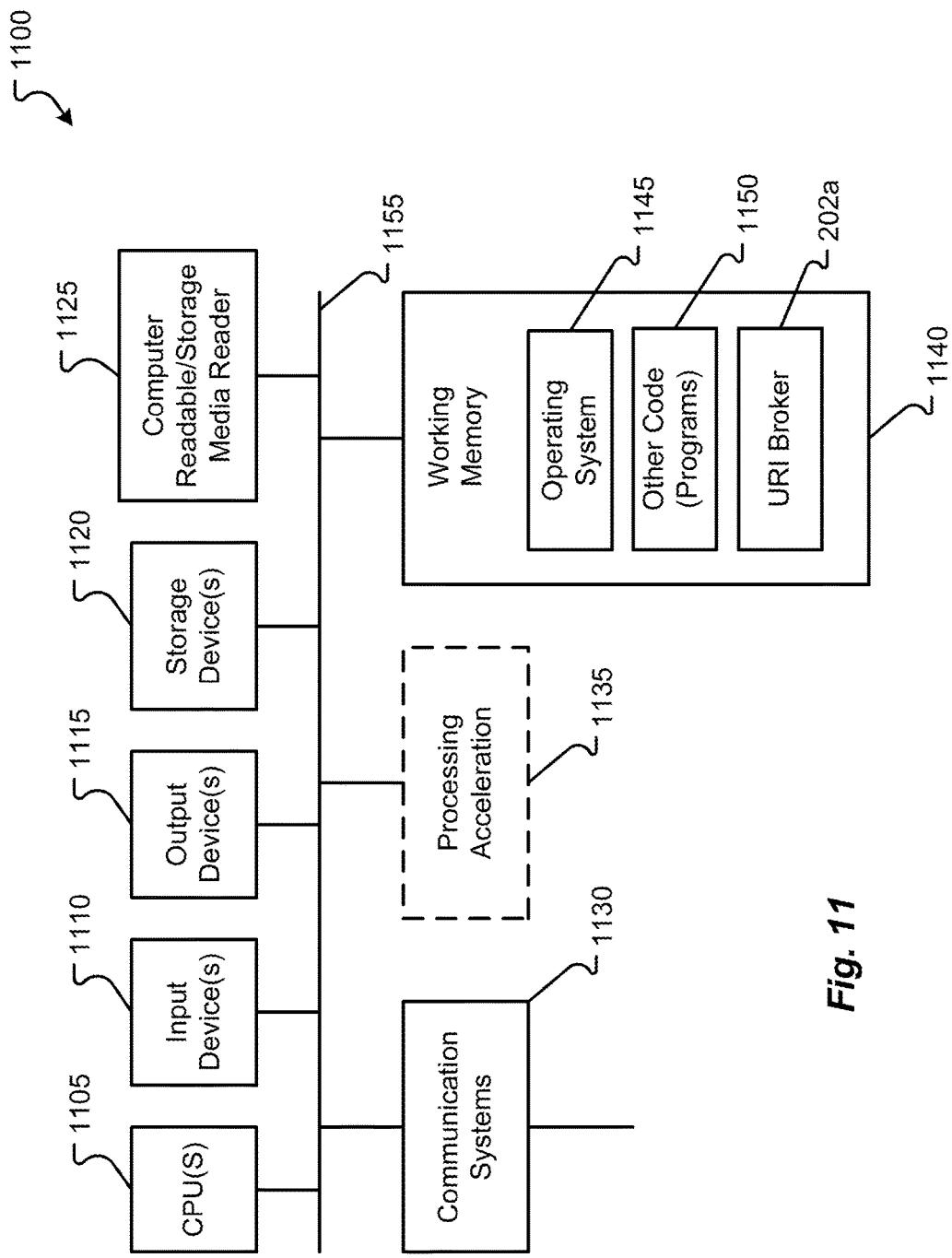
FIG. 11 is a block diagram of an embodiment of a software and/or hardware architecture for an implementation of the computing systems described herein.

FIG. 11 illustrates an embodiment of a computer or computing system 1100 upon which a video conference may be conducted or executed. The computer system 1100 is shown comprising hardware elements that may be electrically coupled via a bus 1155. The hardware elements may include one or more central processing units (CPUs) 1105; one or more input devices 1110 (e.g., a mouse, a keyboard, etc.); and one or more output devices 1115 (e.g., a display device, a printer, etc.). The computer system 1100 may also include one or more storage device(s) 1120. By way of example, storage device(s) 1120 may be disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1125; a communications system 1130 (e.g., a modem, a network card (wireless or wired), an infra-red communication device, etc.); and working memory 1140, which may include RAM and ROM devices as described above. In some embodiments, the computer system 1100 may also include a processing acceleration unit 1135, which can include a DSP, a special-purpose processor and/or the like The computer-readable storage media reader 1125 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1130 may permit data to be exchanged with the network 1120 and/or any other computer described above with respect to the system 1100.

The computer system 1100 may also comprise software elements, shown as being currently located within a working memory 1140, including an operating system 1145 and/or other code 1150, such as program code implementing a web service connector or components of a web service connector. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

A number of variations and modifications of the disclosure can be used. It would be possible to provide for some features of the disclosure without providing others.

For example in one alternative embodiment, One embodiment of the invention preferably implements the use of the XMPP protocol (xmpp:). XMPP is a standards based IM/P (Instant Messaging and Presence) protocol whereby if a registered handler is available, users can select and initiate a chat conversation with a user. Prior art web-based chat clients do not support such a registration capability, thus when the extension handler takes an xmpp: request, it can pass through to such an application leveraging proprietary APIs (e.g., Google Hangouts cannot be invoked directly from such URI links for chat or audio/video calling purposes). However, with the URI Broker 202a implemented, the URI Broker 202a can utilize Hangout's proprietary APIs and invoke Hangout Apps to initiate those functions in a relevant manner after a user clicks a xmpp: (chat) or tel: (audio/video call) type link.

In embodiments, a URI may invoke an app that may be a native app custom developed for a particular operating system and downloaded from the OS vendor (e.g., the app may be specifically developed for iOS, downloaded from the Apple AppStore, and installed and running on an Apple iPhone5). The URI Broker 202a can ensure that these apps, which may not be natively executed, based on a selection of a URI, perform the functions desired by the user and the URI.

The URIs may be present in many forms of content. For example a URI embedded in HTML may start a communications session (e.g., a voice call with another user). Similarly, a developer may embed the URI in an e-mail signature that can enable an SMS or an IM message session to be initiated when clicked.

In some embodiments, clicking the URI may enable a voice or video session to be established between end devices using technologies like WebRTC, which include the fundamental components for communications on the Internet. These components, when implemented in a browser, allow access to the camera and microphone, enables sets up of audio and video calls, and allows web browsers to share data via peer-to-peer connections.

In embodiments, when the URI broker invokes an application or API, the systems and methods described herein map the relevant fields or parameters from the initial URI action to the invoked destination in a relevant manner (e.g., a user name for chat, a phone number or another ID for calling, and options or toggles for the aforementioned URI are mapped).

In another embodiment, information may be added by the systems and methods described herein based on the invocation context. For example when a user clicks a tel:#### URI, the URI Broker 202a resolves the #### phone number to a specific user, the invocation destination has an entry for said user that is not a phone number, but can be executed or connected via a different ID (that is not a phone number) and belongs to the said user. In other words. the URI Broker 202a may be able to associated, for example, an email address in a tel:#### URI with a phone number of a called party based on information stored at the user device, for example, in a contacts folder or address book of the user.

The exemplary systems and methods of this disclosure have been described in relation to a computer system, device, server, data structure, etc. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), which may have a single core or multiple cores, memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the Detailed Description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A non-transitory computer readable medium comprising instructions stored in a non-transitory memory and executed by a processor of a user device, wherein the instructions cause the processor to execute a method for enabling a uniform resource identifier (URI), the instructions comprising:
    instructions to receive a selection of the URI by a user on the user device, wherein the URI is embedded in an application executing on the user device;
    instructions to intercept the selection of the URI with a URI Broker, wherein the URI Broker is executed by the processor;
    instructions to redirect the URI based on a mapping in a data store stored on a server in communication with the user device through a network, wherein the data store comprises user preference data; and
    instructions to launch functionality, by the URI Broker, based on the mapping, wherein the application does not natively execute the functionality based on the URI, wherein the functionality is based on the user preference data, and wherein the functionality is one of a web service, an application programming interface (API), and a second application.

2. The computer readable medium according to claim 1, wherein the URI Broker is a second application executing on the user device.

3. The computer readable medium according to claim 2, wherein the data store is associated with a server that is in communication with the user device through a network.

4. The computer readable medium according to claim 3, wherein the URI is associated with a URI scheme and a first preference defined by a developer.

5. The computer readable medium according to claim 4, wherein the URI scheme and the first preference are stored in the data store.

6. The computer readable medium according to claim 5, the instructions further comprising:
    instructions to retrieve the first preference from the data store; and
    wherein the functionality is based in part on the first preference.

7. The computer readable medium according to claim 6, wherein the user preference data overrides the first preference.

8. The computer readable medium according to claim 1, wherein intercepting the selection of the URI comprises executing browser extension technology that intercepts webpage content.

9. A user device comprising:
    a memory configured to store instructions to execute a URI Broker;
    a processor in communication with the memory, wherein the processor retrieves the instructions from the memory and executes the URI Broker based on the instructions, wherein, when executing the URI Broker, the processor is configured to:

receive a selection of the URI by a user on the user device, wherein the URI is embedded in an application executing on the user device;

intercept the selection of the URI with a URI Broker, wherein the URI Broker is executed by the processor;

redirect the URI based on a mapping in a data store stored on a server in communication with the user device through a network, wherein the data store comprises user preference data; and launch functionality, by the URI Broker, based on the mapping, wherein the application does not natively execute the functionality based on the URI, wherein the functionality is based on the user preference data, and wherein the functionality is one of a web service, an application programming interface (API), and a second application.

10. The device according to claim 9, wherein the processor is further configured to:

retrieve a first preference from the data store, wherein the URI is associated with a URI scheme and the first preference defined by a developer, wherein the first preference defines which functionality the developer desires for the URI; and wherein the functionality is based on at least one of the user preference and the first preference.

11. The device according to claim 10, wherein the user preference data overrides the first preference.

* * * * *

UNITED STATES PATENT AND TRADEMARK OFFICE
CERTIFICATE OF CORRECTION

PATENT NO. : 10,447,797 B2
APPLICATION NO. : 14/802274
DATED : October 15, 2019
INVENTOR(S) : Bryan Dingwall, Sergey Vlasenko and Mohammad Nezarati Page 1 of 1

It is certified that error appears in the above-identified patent and that said Letters Patent is hereby corrected as shown below:

In the Claims

At Column 27, Lines 24-25, please delete "at least one of the user preference and" therein.

Signed and Sealed this
Seventeenth Day of December, 2019

Andrei Iancu
*Director of the United States Patent and Trademark Office*